United States Patent
Naef et al.

(10) Patent No.: US 9,336,616 B2
(45) Date of Patent: May 10, 2016

(54) POWER TRANSMISSION NETWORK STATE VISUALIZATION

(71) Applicant: ABB RESEARCH LTD, Zürich (CH)

(72) Inventors: Martin Naef, Niederrohrdorf (CH); Mats Larsson, Baden-Dättwil (CH)

(73) Assignee: ABB RESEARCH LTD, Zurich (CH)

( * ) Notice: Subject to any disclaimer, the term of this patent is extended or adjusted under 35 U.S.C. 154(b) by 335 days.

(21) Appl. No.: 14/017,832

(22) Filed: Sep. 4, 2013

(65) Prior Publication Data

US 2014/0139528 A1 May 22, 2014

(30) Foreign Application Priority Data

Sep. 4, 2012 (EP) .................................... 12182878

(51) Int. Cl.
*G06T 11/20* (2006.01)
*H02J 13/00* (2006.01)
*G06T 11/40* (2006.01)

(52) U.S. Cl.
CPC .............. *G06T 11/206* (2013.01); *G06T 11/40* (2013.01); *H02J 13/001* (2013.01); *Y04S 10/40* (2013.01)

(58) Field of Classification Search
None
See application file for complete search history.

(56) References Cited

U.S. PATENT DOCUMENTS

| 6,313,752 | B1 | 11/2001 | Corrigan et al. |
| 8,332,247 | B1 * | 12/2012 | Bailey ............. G06Q 10/06375 705/13 |
| 9,123,160 | B1 * | 9/2015 | Hollis .................... G06T 17/05 |
| 2003/0033582 | A1 * | 2/2003 | Klein ................ G06F 17/30958 716/136 |
| 2011/0261057 | A1 | 10/2011 | Freyhult et al. |

OTHER PUBLICATIONS

European Search Report dated Dec. 19, 2012.
Vu Thanh Nguyen, "Building TIN (triangular irregular network) problem in Topology model", Jul. 11, 2010, pp. 14-21.
Larsson M. et al., "Mapping the weakest link", Jan. 1, 2007, pp. 44-48.

* cited by examiner

*Primary Examiner* — Peter Hoang
(74) *Attorney, Agent, or Firm* — Buchanan Ingersoll & Rooney PC

(57) ABSTRACT

A method and system are provided for visualizing and displaying a state of a power transmission network to an operator, for the supervision of the network. The method and system are provided for visualizing or contouring a power transmission network state by displaying to an operator output data values interpolated at output data locations from input data including geographically distributed input data sensor locations and corresponding dynamically updated input data values. The method includes dividing a geographical area of interest into triangles, wherein a triangle vertex is defined at each input data location within the area, determining, for each triangle, closest input data locations according to a closeness criteria, and interpolating by weighting or scaling at each output data location within a triangle the input data values of a number of closest input data locations to generate output data values corresponding to the output data locations.

6 Claims, 2 Drawing Sheets

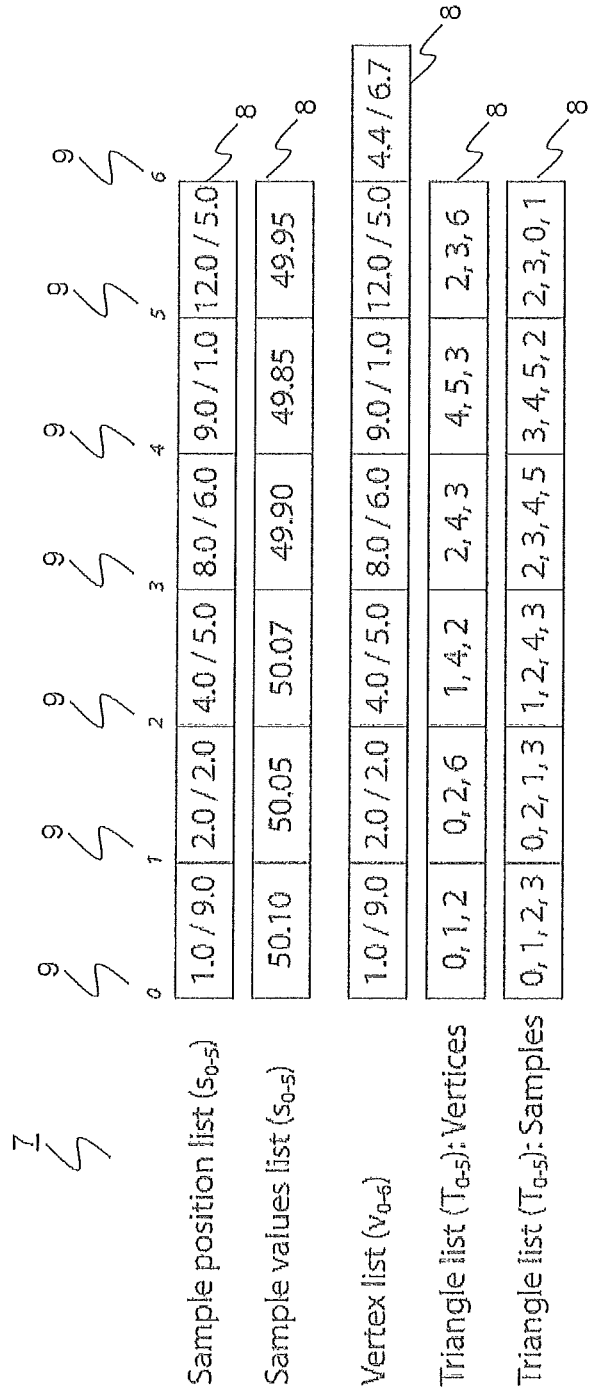

POWER TRANSMISSION NETWORK STATE VISUALIZATION

RELATED APPLICATION

This application claims priority under 35 U.S.C. §119 to European Patent Application No. 12182878.4 filed in Europe on Sep. 4, 2012, the entire content of which is hereby incorporated by reference in its entirety.

FIELD

The present disclosure relates to the field of supervision of a power transmission network, for example, to visualizing and displaying a network state to an operator.

BACKGROUND INFORMATION

A power transmission network is supervised and monitored as system disturbances within the network can result in partial compromise or even partial failure of the network. An operator is made aware of any outages within the network such as generator, substation or transmission line outages in order to conduct responsive measures. Therefore, the network is supervised at least partially by an operator. For human supervision, the state of the network is displayed on a screen or a similar viewing device such as a graphical user interface.

In general, the power transmission network includes a great number of data locations from which data values are collected. Stations used for supervision are known as supervisory control and data acquisition (SCADA) units. In these units, generally, some processes, parameters or local statuses are supervised automatically. In addition, human supervision is needed for proper operation of the network. However, the operator is physically not able to analyze every single data location and the data values received from it. Therefore, in order to be able to assess the network state, it is known to interpolate the data values of neighboring data locations and to visualize the original data and the interpolated values, for example, by means of areal color coding or shading, or by means of iso-lines or contour lines interconnecting locations of equal value on a map. However, the interpolation operation is a heavy calculation load for the system processor due to the great number of data locations and the correlation between those locations.

In the map, the geographical distribution of the data locations are shown in a graphical visualization, such as the above-mentioned color code, iso-lines, or a similar representation. The visualization highlights network problems and their location such as by coloring the respective area on the map. This allows the operator to assess the network state without analyzing each data location and allows the operator to take appropriate measures to resolve the problem.

U.S. Pat. No. 6,313,752 discloses a way of displaying dynamic on-line operating conditions of an interconnected power transmission network, and discloses a use of iso-voltage contours for visualization of power system operating conditions. A location and nature of any disturbance occurring in the network is indicated on the map by a change in the positions of the isovoltage and isophase contour lines relative to their normal positions.

However, as the system has to acquire, analyze and display a great amount of data values from many different data locations, the visualization update to represent the latest acquired data values is relatively slow, for example, in a large network, it can take up to several seconds to update the data and refresh the visualization display. Thus, the operator experiences a time delay while supervising the network as only a snapshot of the network state is displayed. The time delay is not only inconvenient for the operator but can delay time-critical measures and responses to problems while an emergency develops within the network as the operator is not updated in real-time.

SUMMARY

An exemplary embodiment of the present disclosure provides a method of visualizing a power transmission network state by displaying output data values interpolated at output data locations from input data including input data locations and corresponding input data values. The exemplary method includes dividing a geographical area of interest into triangles, and determining, for each triangle, closest input data locations according to a closeness criteria. In addition, the exemplary method includes interpolating, for an output data location within a corresponding one of the triangles, the input data values of a number N of closest input data locations of the triangle to generate an output data value corresponding to the output data location.

An exemplary embodiment of the present disclosure provides a system for visualization of a power transmission network state by displaying output data values interpolated at output data locations from input data including input data locations and corresponding input data values. The exemplary system includes triangulation means for dividing a geographical area of interest into triangles, wherein a triangle vertex is defined at each input data location within the area, and for determining, for each triangle, closest input data locations according to a closeness criteria. In addition, the exemplary system includes programmable graphics hardware configured to interpolate, for each output data location within a triangle the input data values of a number N of closest input data locations of the triangle to generate output data values corresponding to the output data locations.

BRIEF DESCRIPTION OF THE DRAWINGS

Additional refinements, advantages and features of the present disclosure are described in more detail below with reference to exemplary embodiments illustrated in the drawings, in which:

FIG. 2 schematically shows a data structure according to an exemplary embodiment of the present disclosure.

The reference symbols used in the drawings, and their meanings, are listed in summary form in the list of designations. In principle, identical parts are provided with the same reference symbols in the drawings.

DETAILED DESCRIPTION

Figure 1:
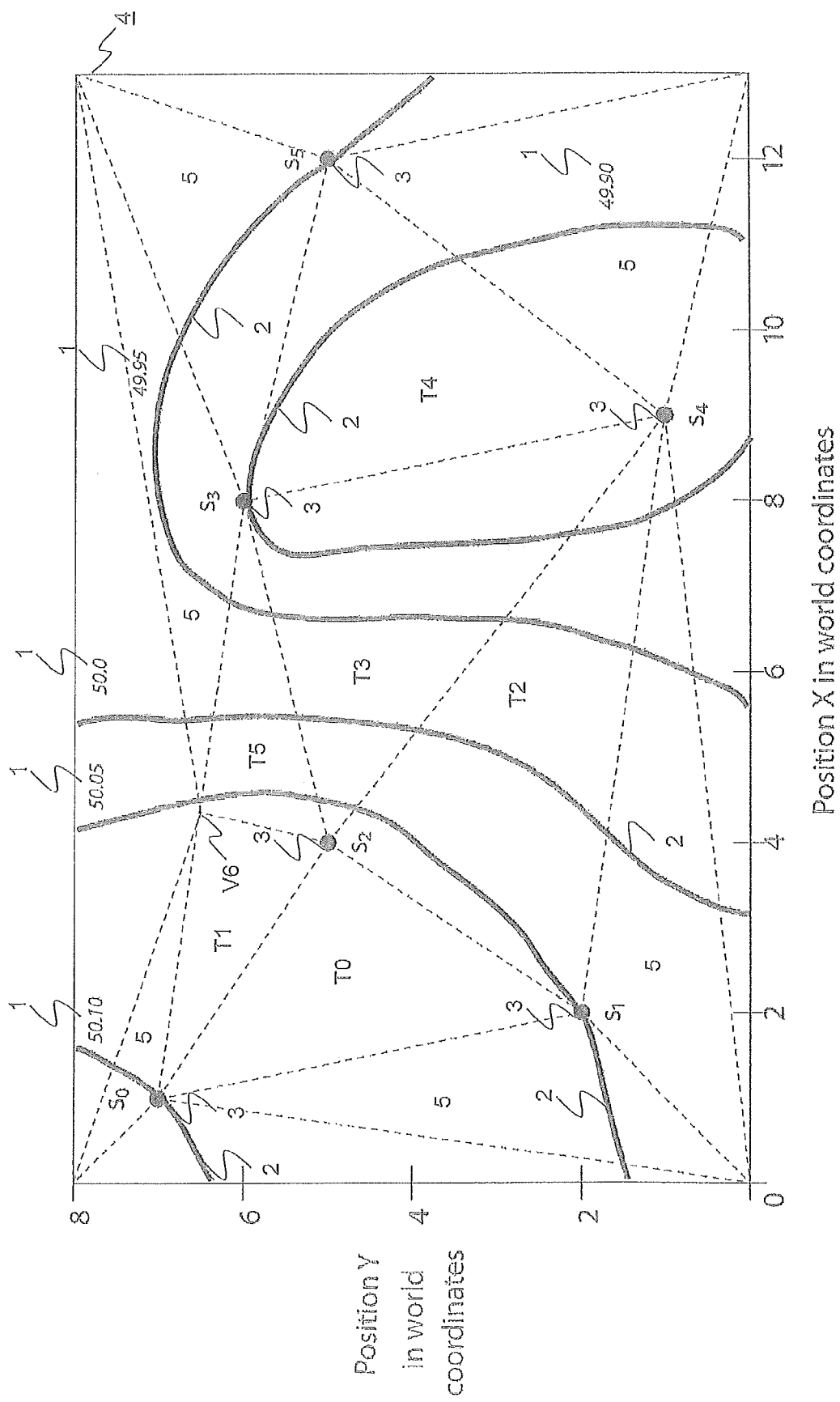
FIG. 1 depicts a contour plot and the underlying triangle mesh according to an exemplary embodiment of the present disclosure.

Exemplary embodiments of the present provide a method and system which display a network state in real-time to an operator, for example, a power transmission network state. This objective is achieved by a method and a system for visualizing a network state by displaying output data values interpolated at output data locations from input data including input data locations and corresponding input data values, according to the exemplary embodiments described hereinafter.

According to an exemplary embodiment of the present disclosure, interpolated output data values are displayed to an operator, wherein the output data values correspond to, or are attributed to, selected output data locations. Visualizing known as contouring is performed by displaying the data values on a map, for example, by color coding, wherein the map includes the output data locations. The output data is based on input data including operational input data values retrieved from corresponding input data or sensor locations. For monitoring the network state, the input data values are permanently and dynamically updated in order to obtain the latest status. The input data locations can be statically distributed over a wide geographical area of interest such as a country or a region.

In an initial step, a geographical area of interest is divided into triangles. The triangles include triangle vertices such as corners of a triangle, with input data locations defining preferred triangle vertices. This process of defining a network grid is known as triangulation. An exemplary triangulation is a Delaunay triangulation, which subdivides the complete area into a well-behaved, optimal grid with the input data locations as the corners or triangle vertices. The Delaunay triangulation ensures that no data location is inside of any triangle and that the corners are the three closest input data locations to the center. Furthermore, the grid can be optimized with an additional subdivision step defining triangle vertices at virtual data locations different from the input data locations. This way, large triangles are split until they are deemed to be small enough.

In a further step, closest input data locations are determined for each triangle. The closest input data locations are identified by applying a closeness criteria defined by a distance to the triangle. The distance can be defined as the distance to the center, the minimal distance to each corner, or the distance to the closest edge of the triangle. In an exemplary embodiment, a sorted list of the closest input data locations is generated according to the closeness criteria. Furthermore, other criteria such as a maximum distance for data locations to be taken into account, or additional weight factors for specifically important data locations can be applied.

In a next step, a number N of closest input data locations and corresponding values are taken into consideration for calculating output data values for the output data locations within a triangle. The calculation includes interpolating, by weighting or scaling, the input data values with respect to a distance between input data locations and output data location. By limiting the number of closest input data locations the calculation process can be further accelerated as fewer operations are carried out for any update. However, for higher accuracy, a greater number of input data locations can be used. The operator can set the parameter N ranging from all input data locations to only a few depending on the needed accuracy. In accordance with an exemplary embodiment, the N input data locations or closest sample points can be the same for all output data locations or pixels within a triangle.

In accordance with an exemplary embodiment of the present disclosure, an input data structure is generated including, for each triangle, a list of indices of the closest input data locations. The input data structure includes a two-dimensional array, wherein each row corresponds to one triangle and contains a sorted list of indices to the data locations. The layout of the two-dimensional array is configured to suit a graphical processor unit used to carry out further operations. The initial triangulation and the generation of the input data structure is only carried out once during initialization, while, further steps are repeated on a regular basis, for example, for each input data update.

In accordance with an exemplary embodiment of the present disclosure, the interpolation is carried out using the input data structure and the list of indices of the closest input data locations according to the outcome of the closeness criteria interpolating the input data values belonging to the first or top N indices of the sorted list of indices.

In accordance with an exemplary embodiment of the present disclosure, a confidence level is provided for each input data value. The confidence level is a measure of the reliability of the data value retrieved from a data location and can vary dynamically. For example, the operator can set the level for any given data location or an automated process such as an algorithm can set the level according to further information on data value, for example, overall reliability of the measurement at the data location in the past. Therefore, notoriously poor measurements can be taken into account at a lower weight compared to more reliable ones. In addition, failing sensors can be assigned a subcritical confidence level such as to ensure they are disregarded for further processing. Interpolation in this embodiment is carried out for a predefined number N of input data values with a preset minimum confidence level, wherein other data values are not considered.

In a final step, a two-dimensional output pattern is generated based on output data locations and interpolated output data values, and the two-dimensional output pattern is further displayed for viewing the power transmission network state by an operator on an optical output device such as a screen or the like.

According to an exemplary embodiment of the disclosure, the interpolation of data values and the generation of the output pattern is performed for every update of the displayed output pattern, wherein the triangulation and the generation of the input data structure is, however, only carried out once initially.

The present disclosure also relates to a system for visualization of a power transmission network state by displaying to an operator output data values interpolated at output data locations from input data including geographically distributed input data locations and corresponding dynamically updated input data values. The system includes triangulation means configured to divide a geographical area of interest into triangles, wherein a triangle vertex such as a corner is defined at each input data location within the area. The triangulation means is further configured to determine, for each triangle, closest input data locations according to a closeness criterion. In accordance with an exemplary embodiment, the triangulation means may be constituted by a general or application specific processor, or part thereof, which is configured to execute a computer program and/or computer-readable instructions tangibly recorded on a non-transitory computer-readable recording medium (e.g., a non-volatile memory such as a hard disk drive, ROM, flash memory, optical memory, etc.).

Programmable graphics hardware (e.g., a processor of a computer processing device such as a computer) of the system is configured to interpolate, by weighting or scaling, at each output data location within a triangle, the input data values corresponding to a number N of closest input data locations to generate output data values corresponding to the output data locations.

Accordingly, the two-dimensional output pattern is generated by an algorithm that is significantly more efficient than traditional approaches and that may be executed by a graphical processing unit or other processing hardware. This way, the output pattern can be updated within several milliseconds and, thus, provide a real-time view of the current network state.

FIG. 1 shows a contour plot to visualize a power transmission network state as displayed to an operator. In the plot, output data values 1 are displayed interpolated at output data locations 2. The output data values 1 are represented by iso-lines or contour lines interconnecting locations of equal value on the plot. The number next to the iso-line is the actual value. This way, an operator can easily get an overview of the network state and if necessary check all values in detail and take necessary measures in case of any outages such as generator, substation or transmission line outages. The interpolation at output data locations 2 is carried out using input data including input data locations 3 and corresponding input data values.

In order to display the network state in a plot as shown in FIG. 1 or a similar representation in real time with only a minimal delay the output data values 1 are interpolated by dividing a geographical area of interest 4 into triangles 5. Wherever appropriate, large triangles 5 can be subdivided as depicted in order to improve the interpolation. For this purpose, virtual data locations 6 can be introduced, where no input data is available. However, the virtual or additional data locations 6 subdivide larger triangles 5, thus enabling an improved interpolation.

In a next step, for each triangle 5, closest input data locations 3 are determined according to a closeness criteria such as a specified distance to the triangle 5 or a number N of closest input data locations 3. These input data locations 3 can be actual or virtual data locations. The closest input data locations 3 are saved in a list or an array for further processing and interpolating output data values 1. The closeness criteria can vary from only a few very close neighbors to all input data locations 3, depending on the size of the area of interest 4 and the required updating speed of the visualization. Hence, a greater number of closest input data locations 3 requires more calculation time, and therefore updates, for example, of the iso-line plot is slowed down, respectively.

Furthermore, according to a designated closeness criteria, a number N of closest input data locations 3 of each triangle 5 are taken into account to calculate the output data value 1 corresponding to the output data location 2. This calculation can be an interpolation by weighting or scaling the input data values with respect to a distance or number of input data locations 3 between the input data locations 3 and output data locations 2. This limitation can be used to speed up the interpolation process where needed. However, an operator can change the parameter N ranging from all input data locations 3 to only a few depending on the needed accuracy. In general, the N input data locations 3 or closest sample points are the same for all output data locations 2 or pixels within a triangle.

FIG. 2 depicts an input data structure 7 according to the disclosure. The input data structure 7 is a two-dimensional array and includes several lists 8, for example, sample position list (indicating coordinates of six input data locations), sample value list (indicating input data values corresponding to the input data locations), vertex list (including the six input data locations and an additional virtual data location V6), a first triangle list (including index triplets indicative of the vertices/corners of six exemplary triangles, T0 to T5), and a second triangle list including index quadruplets indicative of four samples or closest input data locations for each of the six triangles. Each index of a triplet or quadruplet refers to a vertex 0 to 6 in the vertex list. The indices within the quadruplets of the second triangle list have been sorted according to a distance or closeness of the corresponding vertex from the respective triangle. Triangle T1 and T5 both include virtual input data point V6 as a vertex, yet the latter is not part of the quadruplet of closest "real" input data locations of the triangles.

The layout of the input data structure 7 is configured to a graphical processor unit used to carry out further operations. The initial division in triangles 5 and the generation of the input data structure 7 are only carried out once during initialization, while, further steps are repeated on a regular basis, i.e. for each input data update. In accordance with an exemplary embodiment, the graphical processor unit may be a general or application specific processor which is configured to execute a computer program and/or computer-readable instructions tangibly recorded on a non-transitory computer-readable recording medium (e.g., a non-volatile memory such as a hard disk drive, ROM, flash memory, optical memory, etc.).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Output data value
2 Output data location
3 Input data location
4 Area of interest
5 Triangle
6 Virtual data locations
7 Input data structure
8 List
9 Indices

What is claimed is:

1. A system for visualization of a power transmission network state by displaying output data values interpolated at output data locations from input data including input data locations and corresponding input data values, the system comprising:
   triangulation means for dividing a geographical area of interest into triangles, wherein a triangle vertex is defined at each input data location within the area, and for determining, for each triangle, closest input data locations according to a closeness criteria; and
   programmable graphics hardware configured to interpolate, for each output data location within a triangle the input data values of a number N of closest input data locations of the triangle to generate output data values corresponding to the output data locations.

2. The system of claim 1, wherein the triangulation means is configured to generate an input data structure including, for each triangle, a list of indices of the closest input data locations, and wherein the programmable graphics hardware further being adapted to identify the N closest input data locations of the triangle from the input data structure.

3. The system of claim 1, wherein the programmable graphics hardware is configured to generate a two-dimensional output pattern based on output data locations and interpolated output data values, and wherein the system comprises an optical output device for displaying the two-dimensional output pattern to an operator.

4. The system according to claim 2, wherein the programmable graphics hardware is configured to sort the list of indices of the closest input data locations according to the closeness criteria and interpolate the input data values corresponding to the first N indices of the sorted list of indices.

5. The system according to claim 1, wherein the triangulation means is configured to provide a confidence level for each input data value and interpolate a predefined number N of input data values with a preset minimum confidence level.

6. The system according to claim 1, wherein the triangulation means is configured to define triangle vertices at virtual data locations different from the input data locations.

* * * * *